United States Patent
Schmisseur

(10) Patent No.: US 6,611,882 B1
(45) Date of Patent: Aug. 26, 2003

(54) INBOUND AND OUTBOUND MESSAGE PASSING BETWEEN A HOST PROCESSOR AND I/O PROCESSOR LOCAL MEMORY

(75) Inventor: Mark A. Schmisseur, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/476,635

(22) Filed: Dec. 31, 1999

(51) Int. Cl.⁷ .............................................. G06F 13/28
(52) U.S. Cl. ............................ 710/22; 710/13; 710/20; 710/52; 712/225; 711/147
(58) Field of Search .................... 710/1, 7, 13, 20–28, 710/36, 39, 112, 33, 52; 709/204, 212, 216, 206; 711/111, 115, 147; 712/225

(56) References Cited

U.S. PATENT DOCUMENTS

| | | | |
|---|---|---|---|
| 5,165,022 A | * 11/1992 | Erhard et al. ............... | 395/275 |
| 5,493,684 A | * 2/1996 | Gephardt et al. ........... | 713/300 |
| 5,640,573 A | * 6/1997 | Gephardt et al. ........... | 713/300 |
| 5,884,027 A | * 3/1999 | Garbus et al. .............. | 709/220 |
| 5,925,099 A | * 7/1999 | Futral et al. ................ | 709/204 |
| 5,950,113 A | * 9/1999 | Meihofer .................... | 455/10 |
| 6,065,085 A | * 5/2000 | Odenwald, Jr. et al. .... | 710/129 |
| 6,134,619 A | * 10/2000 | Futral et al. ................ | 710/112 |

* cited by examiner

Primary Examiner—Jeffrey Gaffin
Assistant Examiner—RiJue Mai
(74) Attorney, Agent, or Firm—Blakely, Sokoloff, Taylor & Zafman LLP

(57) ABSTRACT

Method of passing inbound messages to an I/O processor's local memory. A message is received in a messaging unit within the I/O processor. The messaging unit is read to fetch the message. A free local message frame address is retrieved from the messaging unit. A direct memory access unit coupled to the messaging unit is set up. The message is then copied into the I/O processor's local memory.

18 Claims, 9 Drawing Sheets

INBOUND AND OUTBOUND MESSAGE PASSING BETWEEN A HOST PROCESSOR AND I/O PROCESSOR LOCAL MEMORY

BACKGROUND OF THE INVENTION

1. Field of the Invention

An embodiment of the invention may include input/output data processing within a computer processor. More particularly, a messaging unit (MU) may be employed by a processor to pass inbound and outbound data messages between a peripheral and a memory.

2. Background Information

Electronic products may be thought of as those products that involve the controlled conduction of electrons or other charge carriers, especially through microprocessors. Examples of electronic products include radios, computers, work stations, and servers as well as those involved in high-end networking and storage technology. Just about all electronic products employ one or more microprocessors disposed within a chip located on a printed circuit board. The main central processing unit within the chip may include a host system having a host memory.

One type of processor within the host system may be an input/output (I/O) processor. Conventionally, the I/O processor processes an inbound request message to an I/O device by locating a requested package of data, identifying the I/O device, creating a control mechanism for the I/O device, ensuring that the data actually was transmitted to the I/O device, performing some clean up, and providing an outbound reply message to the host system that indicates to the host that the host request is complete.

To accomplish the above tasks, the I/O processor conventionally employs data handling and processing units such as a core processor and a local memory. These units generally may interact with one another across an internal bus of the I/O processor. A primary function of the core processor is to run applications that process data transferred to or from the I/O device. Conventionally, as a secondary function, the core processor processes I/O requests, both inbound and outbound.

When an inbound request message address is sent to an inbound post queue of the I/O processor through a messaging unit of the I/O processor, the core processor may either copy the inbound request message to the local memory or setup a direct memory access (DMA) unit to copy the inbound message to the local memory. The problem with these two approaches is that the time it takes for the core processor to receive, process, and copy the inbound request message is time taken away from the core processor in performing its primary function of running applications and processing the I/O requests. The same is true for outbound message passing.

The current trend for high-end networking and storage technology pushes more functionality down to lower-level device drivers, while demanding higher performance from microprocessors. As the demand for higher performing microprocessors increases, the demands on core processor time increase.

SUMMARY OF THE INVENTION

An embodiment includes a method of passing inbound messages to processor local memory. According to the embodiment, a message is received in a messaging unit within the processor. The message is fetched from the messaging unit. A free local message frame address is retrieved from the messaging unit. A direct memory access unit coupled to the messaging unit is set up. The message is then copied into the local memory of the I/O processor.

BRIEF DESCRIPTION OF THE DRAWINGS

The features, aspects, and advantages of the invention will become more thoroughly apparent from the following detailed description, appended claims, and accompanying drawings in which:

DETAILED DESCRIPTION OF THE INVENTION

Figure 1:
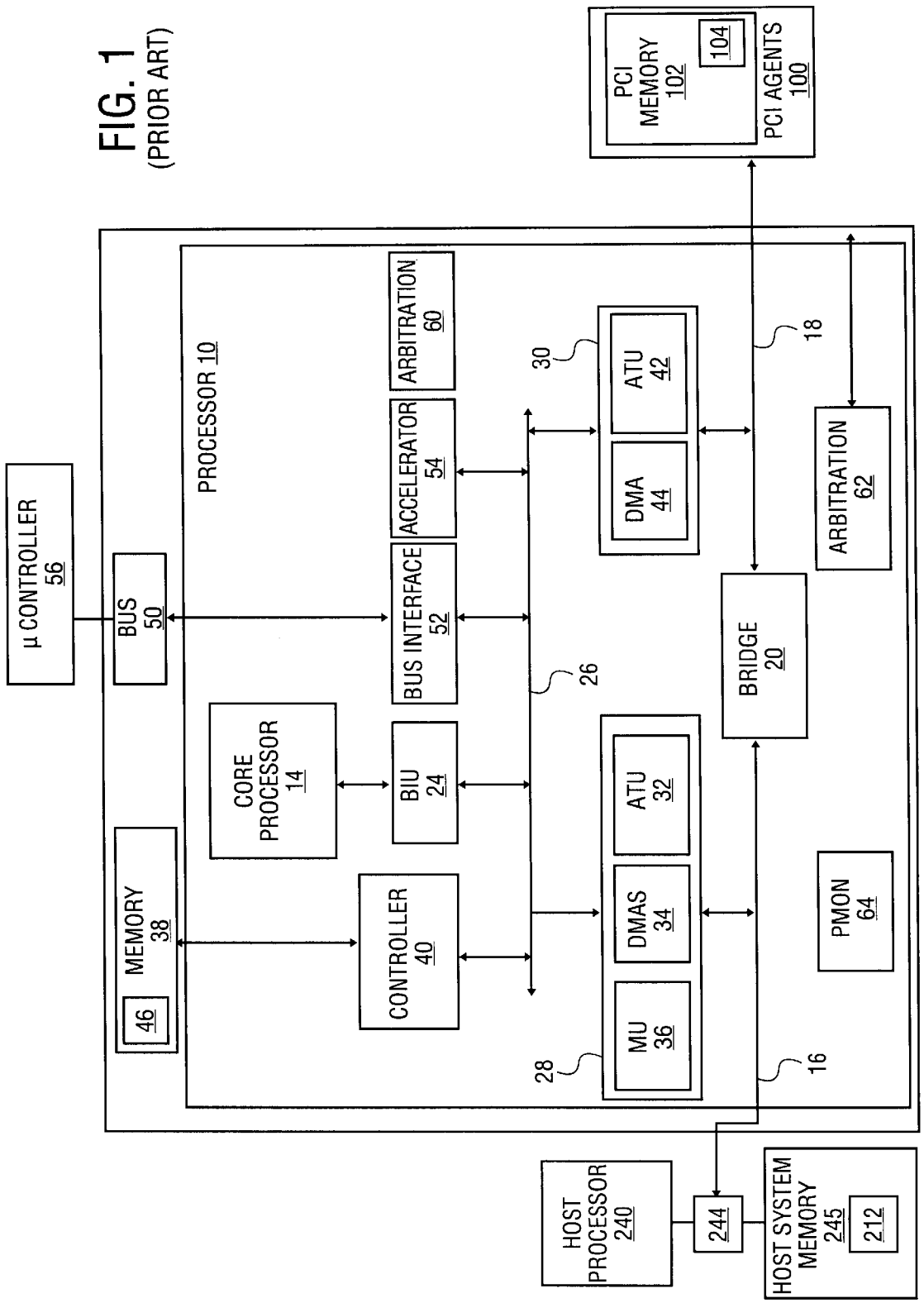
FIG. 1 is a functional block diagram of prior art I/O processor 10.

FIG. 1 illustrates a functional block diagram of prior art I/O processor 10. An example of a known processor functional block diagram is illustrated and described for the Intel® i960® RP Microprocessor as set out in Intel Corporation, i960® *RM/RN I/O Processor Developer's Manual,* pp. 1—1 through 1–12 (1st ed. July 1998). The description regarding FIG. 1 is related to the Intel® i960® RP Microprocessor, but not limited thereto.

As shown in FIG. 1, I/O processor 10 may integrate core processor 14 into a Peripheral Components Interconnect (PCI) functionality so as to address the needs of intelligent input-output applications ("intelligent I/O" or "I$_2$O" applications). Intelligent I/O devices may be coupled to a system interconnect bus such as PCI bus 16 and/or PCI bus 18. Both PCI bus 16 and PCI bus 18 may be industry standard, 64-bit/32-bit, high performance, low latency system buses coupled together by bridge 20. PCI bus 16 and PCI bus 18 need not be busses specific to PCI applications, but may be general busses. The specification for a PCI bus is set forth in the *PCI Local Bus Specification,* revision 2.1, October, 1994, available from the PCI Special Interest Group (PCI-SIG).

Bridge 20 may be a PCI-to-PCI bridge. Along with providing a connection path between the two independent PCI buses 16 and 18, bridge 20 provides the ability to overcome PCI electrical loading limits by allowing certain bus transactions on one PCI bus to be forwarded to the other PCI bus.

Core processor 14 may be indirectly connected to PCI bus 16 and PCI bus 20, such as through bus interface unit 24. Bus interface unit (BIU) 24 may couple core processor 14 to internal bus 26. In turn, internal bus 26 may be coupled to transfer group 28 and transfer group 30. Internal bus 26 may be a 64-bit bus.

As noted above, PCI-to-PCI bridge 20 may provide a link between PCI bus 16 and PCI bus 18. Transfer group 29 may be coupled to PCI bus 16 so as to provide a link from PCI bus 16 to core processor 14. In addition, transfer group 30 may be coupled to PCI bus 18 so as to provide a link form PCI bus 18 to core processor 14. By communicatively connecting core processor 14 to bridge 20, core processor 14 provides "processor intelligence" to bridge 20.

I/O devices such as PCI agents 100 may be coupled to either PCI bus 16 or PCI bus 18 so as to interact with core processor 14 through one of the transfer groups, 28 and 30. Within PCI agent 100 may be PCI memory 102 having PCI address spaces 104. I/O devices coupled to either PCI bus 16 or PCI bus 18 may also included a host processor, such as host processor 240.

Internal bus 26 may be coupled to local memory 38 through memory controller 40. Local memory 38 may be one or more memory systems local to, but external from I/O processor 10 that may not require external logic. Examples of local memory 38 include Synchronous Dynamic Random Access Memory (SDRAM), Read-Only Memory (ROM), and Flash memory.

Transfer group 28 may be composed of Address Translation Unit 32, two Direct Memory Access (DMA) channels 34, and messaging unit 36. Transfer group 30 may be composed of Address Translation Unit 42 and DMA channel 44.

Address Translation Unit (ATU) 32 (or 42) allows transactions (translations) between two address spaces. For example, PCI address space 104 within PCI agent 100 may transact with address space 46 within local memory 38. Address space 242 within host processor 240 may transact with address space 46 within local memory 38.

Address translation may be controlled through programmable registers (not shown) that may be accessible from both host processor 240 and core processor 14. ATU 42 functions similar to ATU 32, but works with PCI bus 18 for PCI agents 100 coupled to PCI bus 18. Dual access to registers through ATU 32 and ATU 42 allows flexibility in mapping the coupled address spaces.

To provide low latency and high throughput data transfers between two address spaces, three separate DMA channels may be provided as shown in FIG. 1. Two DMA channels 34 may be included with transfer group 28 and one DMA channel 44 may be included with transfer group 30. The three DMA channels may operate as a DMA controller to support chaining and unaligned data transfers. This DMA controller may be programmed through core processor 14.

Conventionally, messaging unit (MU) 36 provides message transfer support between host processor 240 coupled to PCI bus 16 and core processor 14 as directed by the $I_2O$ standard. This includes receiving message frame addresses (MFAs) and interrupting core processor 14, or interrupting host processor 240 and returning MFAs. Under an embodiment of the invention, MU 36 can be used to copy the message when a new MFA arrives and then interrupt host processor 240 or core processor 14.

Continuing to refer to FIG. 1, core processor 14 may be coupled to internal bus 26 through bus interface unit 24. Local memory 38 may be coupled to internal bus 26 through memory controller unit 40. Microcontrollers 56 may be coupled to internal bus 26 through Inter-Integrated Circuit ($I^2C$) serial bus 50 in series with $I^2C$ bus interface unit 52. Both local memory 38 and microcontrollers 56 may be external to I/O processor 10. Application accelerator unit 54 may be also coupled to internal bus 26.

Memory controller 40 allows control of local memory 38 within I/O processor 10. Core processor 14 may operate out of local memory 38, where local memory address space 46 may be independent of PCI address space 104 within PCI agents 100, or address space 242 within host processor 240. Bus interface unit (BIU) 24 may forward accesses from core processor 14 to internal bus 26 without translation. Microcontrollers 56 may perform management functions for the systems of I/O processor 10. Application accelerator unit (AAU) 54 may execute data calculations of local memory 38 on behalf of core processor 14.

I/O processor 10 may also include internal arbitration unit 60 to serve as an arbiter for the systems of internal bus 26, PCI arbitration unit 62 to serve as an arbiter for PCI bus 18, and performance monitoring unit (PMON) 64 to compile performance measurements on the three buses: PCI bus 16, PCI bus 18, and internal bus 26. The measurements of PMON 64 can be used to refine code for improved system level performance.

Figure 2:
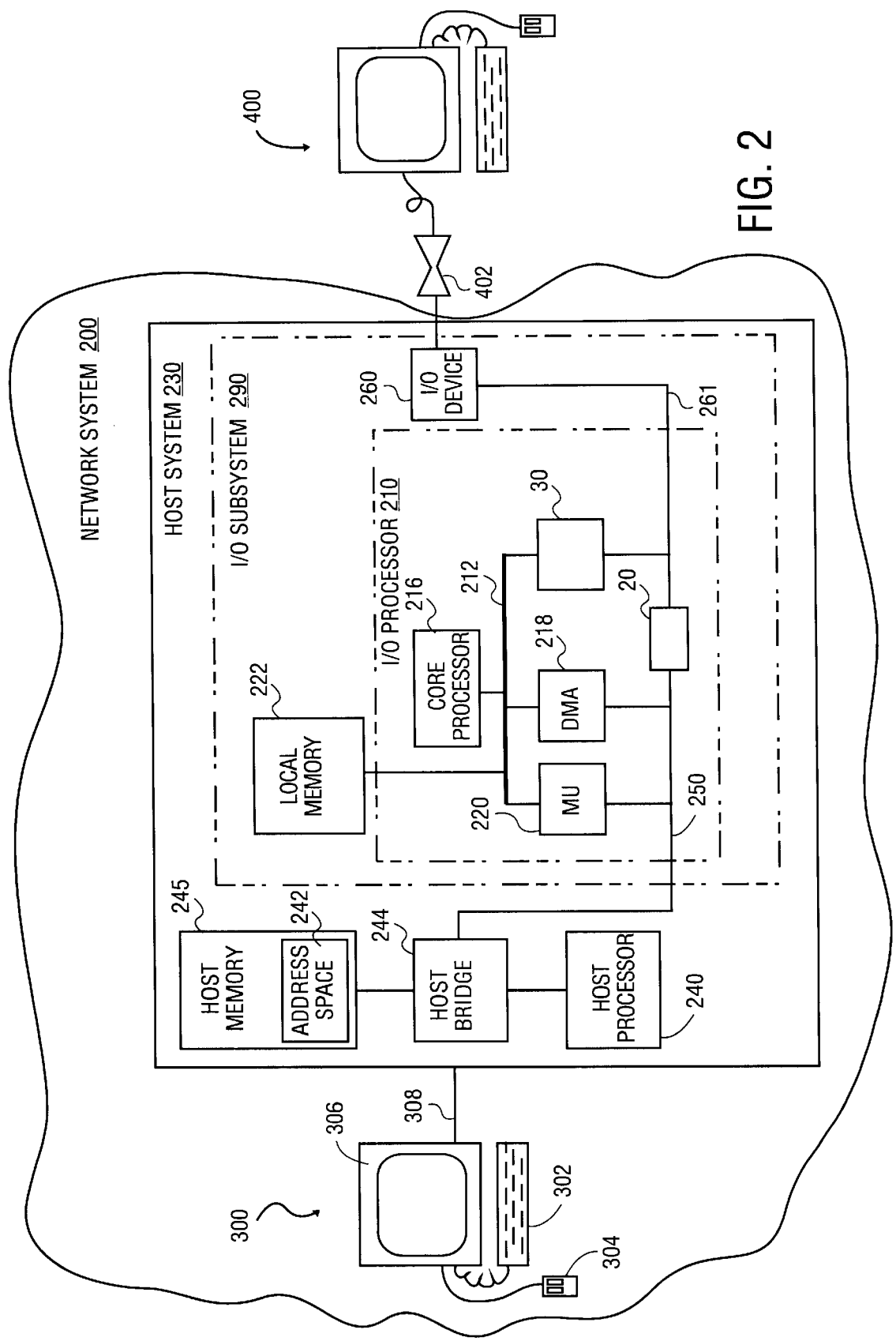
FIG. 2 is a block diagram of networking system 200 including I/O processor 210.

FIG. 2 illustrates a block diagram of networking system 200 including I/O processor 210. As shown, I/O processor 210 may include I/O processor bus 212. Each of core processor 216, DMA 218, MU 220, and local memory 222 may be coupled to I/O processor bus 212. I/O processor 210 may be any I/O processor having an I/O processor bus interfaced with a core processor, a Direct Memory Access unit, a Messaging Unit, and a local memory, where the local memory may be disposed either externally or internally to the I/O processor. I/O processor 210 may be I/O processor 10 discussed above.

Host system 230 may include host processor 240 coupled to or interfaced with MU 220 and DMA 218 of I/O processor 210 through host bridge 244 and host system bus 250. Host processor 240 may be any processor located upstream from I/O processor 210. Host system bus 250 may be any bus that allows communication with a host system. An example of host system bus 250 may be PCI bus 16 of FIG. 1. Also within host system 230 may be I/O device 260 interfaced with I/O processor 210 through bus 261. Bus 261 may be PCI bus 16 or PCT bus 18 of FIG. 1.

Client 300 may be a computer set up that may include data input devices, such as keyboard 302 and mouse 304, and may include monitor 306. Host system 230 physically may be part of client 300, but may be remote from client 300. For example, client 300 may be in one location and host system 230 may be in another location, but connected via communication channels 308 such as radio signals, cabling, or the Internet.

As one example of networking system 200, host system 230 may be connected to client 400 through network lines 402. Network lines 402 may be any form of communication channel over which data from host system 230 may be transmitted to client 400. Client 400 may be composed of one computer or millions of computers.

Messaging Overview

Computer systems such as host system 230 may use messaging schemes for control of I/O subsystems. Request messages may be generated by host processor 240 and consumed by I/O subsystems coupled to PCI agents 100 (FIG. 1). A generated request message may provide instructions to the I/O subsystem specifying what actions to perform. An I/O subsystem may also send messages to host processor 240 that may be referred to as completion messages. Completion messages may indicate the completion of a previous request message or may notify the host processor 240 of some I/O activity such as the receipt of a packet from a network subsystem. Completion messages may be consumed by host processor 240.

With respect to I/O processor 210, there may be two types of operations: an inbound operation and an outbound operation. An inbound operation may include an operation where data may be directed into I/O processor 210 from host processor 240 (such as a request message) and an outbound operation may include an operation where data may be directed out from I/O processor 210 to host processor 240 (such as a completion message). The direction may be from the reference of the I/O processor. An aspect of the invention provides for increased computer system performance by improving how inbound and outbound messages may be managed.

Conventional Inbound Messaging

Various schemes exist for inbound messaging. For example, referring again to FIG. 2, one scheme minimizes the direct interaction between host processor 240 and I/O subsystem 290 coupled to a PCI agent. This scheme requires I/O subsystem 290 to move the inbound message from a host memory to the memory of the I/O subsystem for consumption. This scheme is referred to as the "Pull Model" of message handling since I/O subsystem 290 pulls the message into local memory 222 from a host memory.

In another scheme, host processor 240 writes the inbound message directly to I/O subsystem local memory 222. This is referred to as the "Push Model" of message handling. An advantage of the pull model is that computer systems may be optimized for memory accesses by host processors and not I/O subsystem accesses by host processors. By minimizing the number of accesses the host processor must perform to/from the I/O subsystem, computer system performance may be increased.

Inbound Messaging Operation

Figure 3:
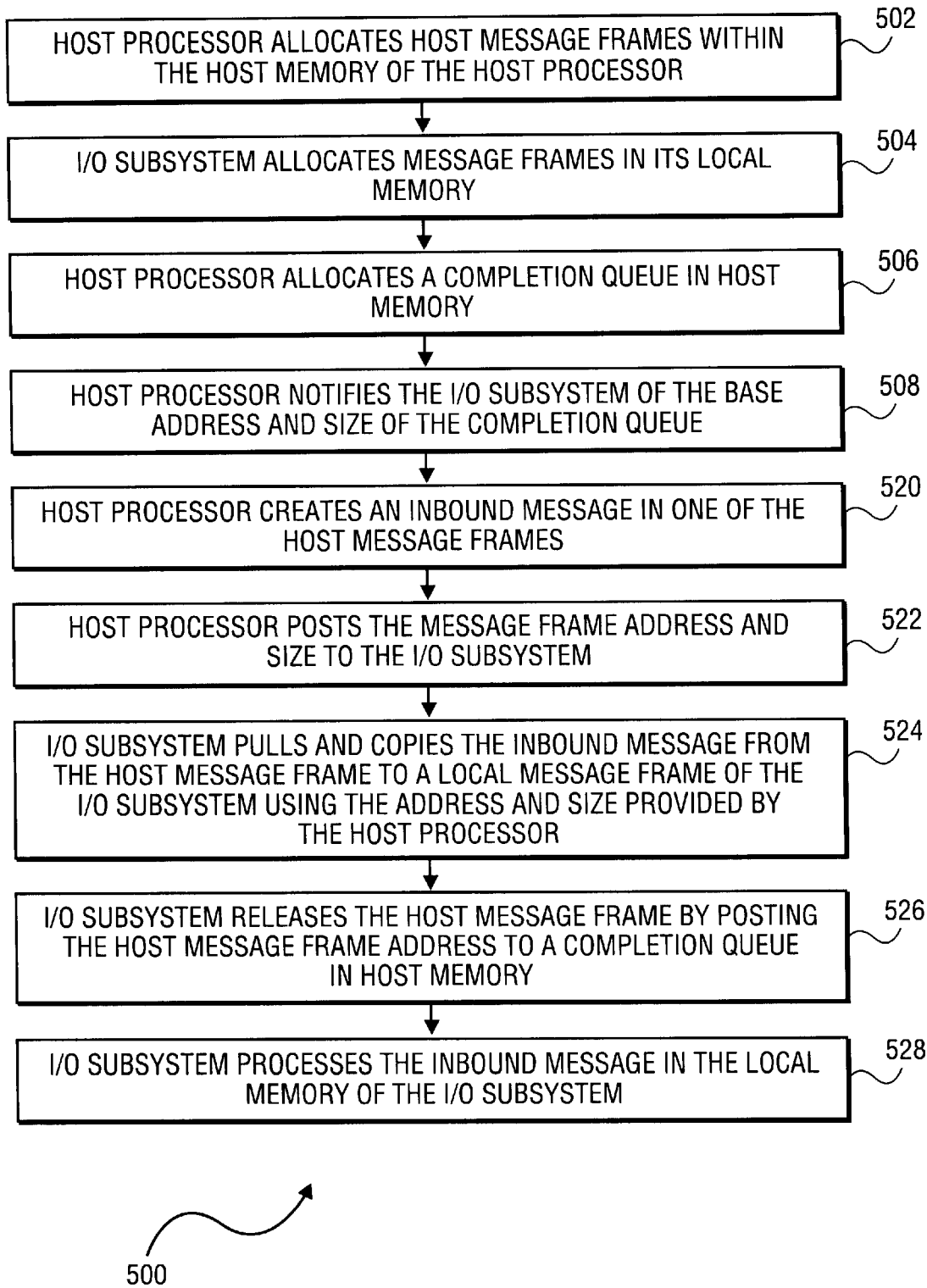
FIG. 3 illustrates method 500 of pull model inbound messaging.

FIG. 3 illustrates method 500 of pull model inbound messaging.

System Setup: To perform system setup, a host processor allocates host message frames within the host memory of the host processor at block 502 for use by future request messages. An I/O subsystem, such as processor 10 of FIG. 1, allocates message frames in its local memory at block 504 where the request messages may be copied or reproduced. At block 506, the host processor allocates a completion queue in host memory. The completion queue will hold the MFAs of the host message frames when the I/O subsystem has completed reproducing or copying the message to the local memory of the I/O subsystem. At block 508, the host processor notifies the I/O subsystem of the base address and size of the completion queue, thereby setting up the system.

Inbound Message Sequence

With the system setup, method 500 proceeds to block 520 where the host processor creates an inbound message in one of the host message frames. At block 522, the host processor posts the message frame address and size to the I/O subsystem. Here, the pull model scheme defines the format so that the address and size can be posted to the I/O subsystem in a single transaction by the host processor.

At block 524, the I/O subsystem pulls and copies the inbound message from the host message frame to a local message frame of the I/O subsystem using the address and size provided by the host processor. The I/O subsystem releases the host message frame at block 526 for use by the host processor by posting the host message frame address to a completion queue in host memory. At block 528, the I/O subsystem processes the inbound message in the local memory of the I/O subsystem.

Current Implementation

As discussed above, high performance computer systems implement I/O subsystems with an I/O processor (IOP) that controls the I/O subsystem. The IOP may be designed with special hardware for managing message address queue lists. The IOP will have a core processor such as core processor 216 to process messages and access a host memory such as host memory 245 and a local memory such as local memory 222 of FIG. 2. Moreover, as discussed above, an IOP may also include a Direct Memory Access (DMA) unit that efficiently copies data between a host memory and the local memory of the IOP.

Figure 4:
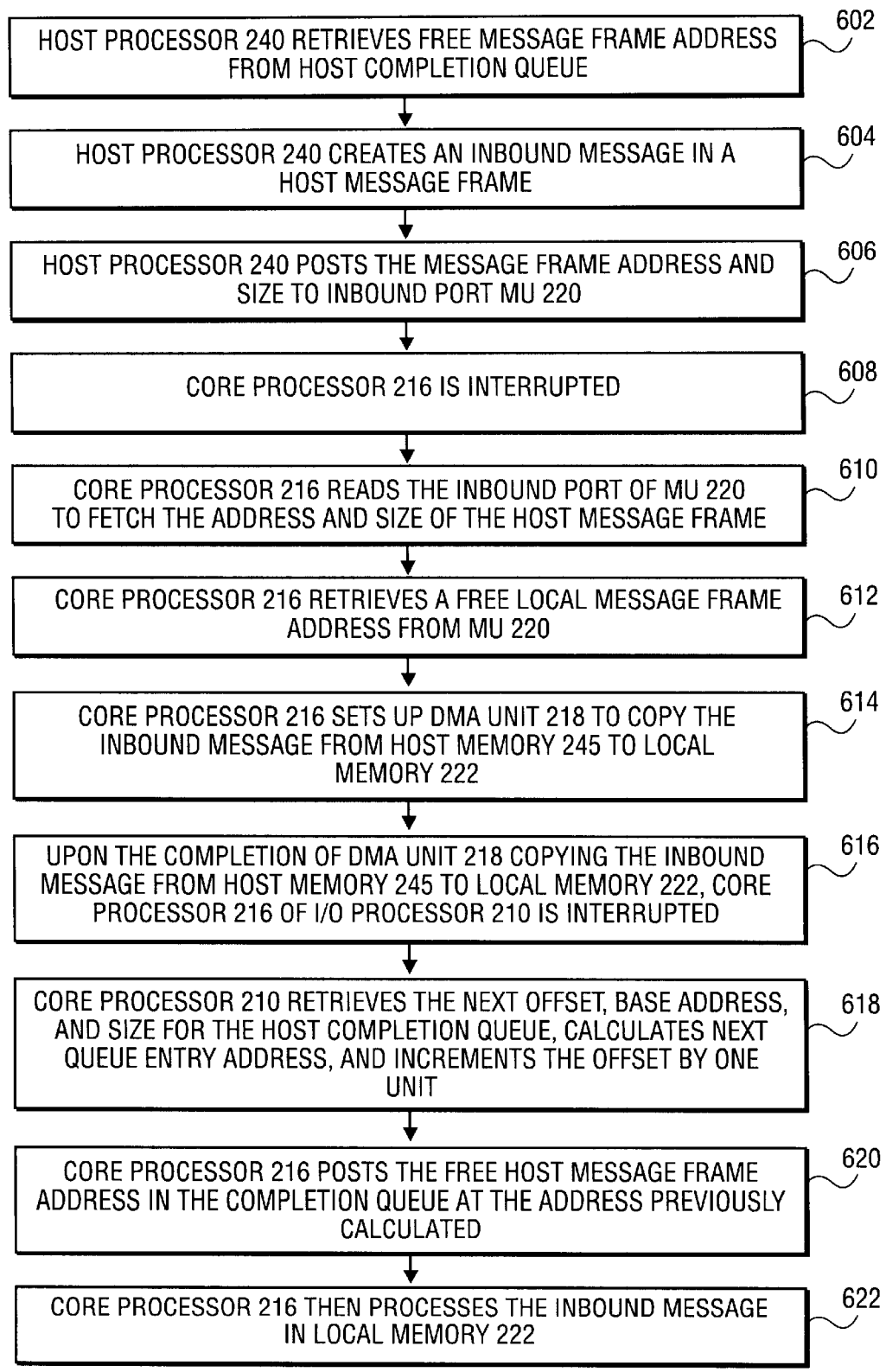
FIG. 4 illustrates method 600 of inbound messaging.

FIG. 4 illustrates method 600 of inbound messaging. At step 602 host processor 240 retrieves free message frame address from host completion queue. At block 604, host processor 240 creates an inbound message in a host message frame. At block 606, host processor 240 posts the message frame address and size to inbound port of MU 220. Core processor 216 may be interrupted at block 608. At block 610, core processor 216 reads the inbound port of MU 220 to fetch the address and size of the host message frame.

At block 612, core processor 216 retrieves a free local message frame address from MU 220. With the address and size of the host message frame, and the address of the local message frame, core processor 216 sets up DMA unit 218 at block 614 to copy the inbound message from host memory 245 to local memory 222. Upon the completion of DMA unit 218 copying the inbound message from host memory 245 to local memory 222, core processor 216 of I/O processor 210 will be interrupted at block 616.

At block 618, core processor 210 retrieves the next offset, base address, and size for the host completion queue, calculates next queue entry address, and increments the offset by one unit. At step 620, core processor 216 posts the free host message frame address in the completion queue at the address calculated in block 618. At block 622, core processor 216 then processes the inbound message in local memory 222.

The amount of work core processor 210 performs to achieve inbound message passing reduces the amount of processing time that can be used to process the inbound messages. The same is true for outbound message passing.

An Inbound Message Sequence Embodiment

An embodiment of the invention may create a coupling between the MU 220 and DMA unit 218 so that the inbound message sequence can be performed autonomously, freeing core processor 216 to the important work of processing messages. The coupling may be created by a MU/DMA coupler formed of hardware state machines that may reside in the hardware design of the MU 220 and DMA unit 218.

Figure 5:
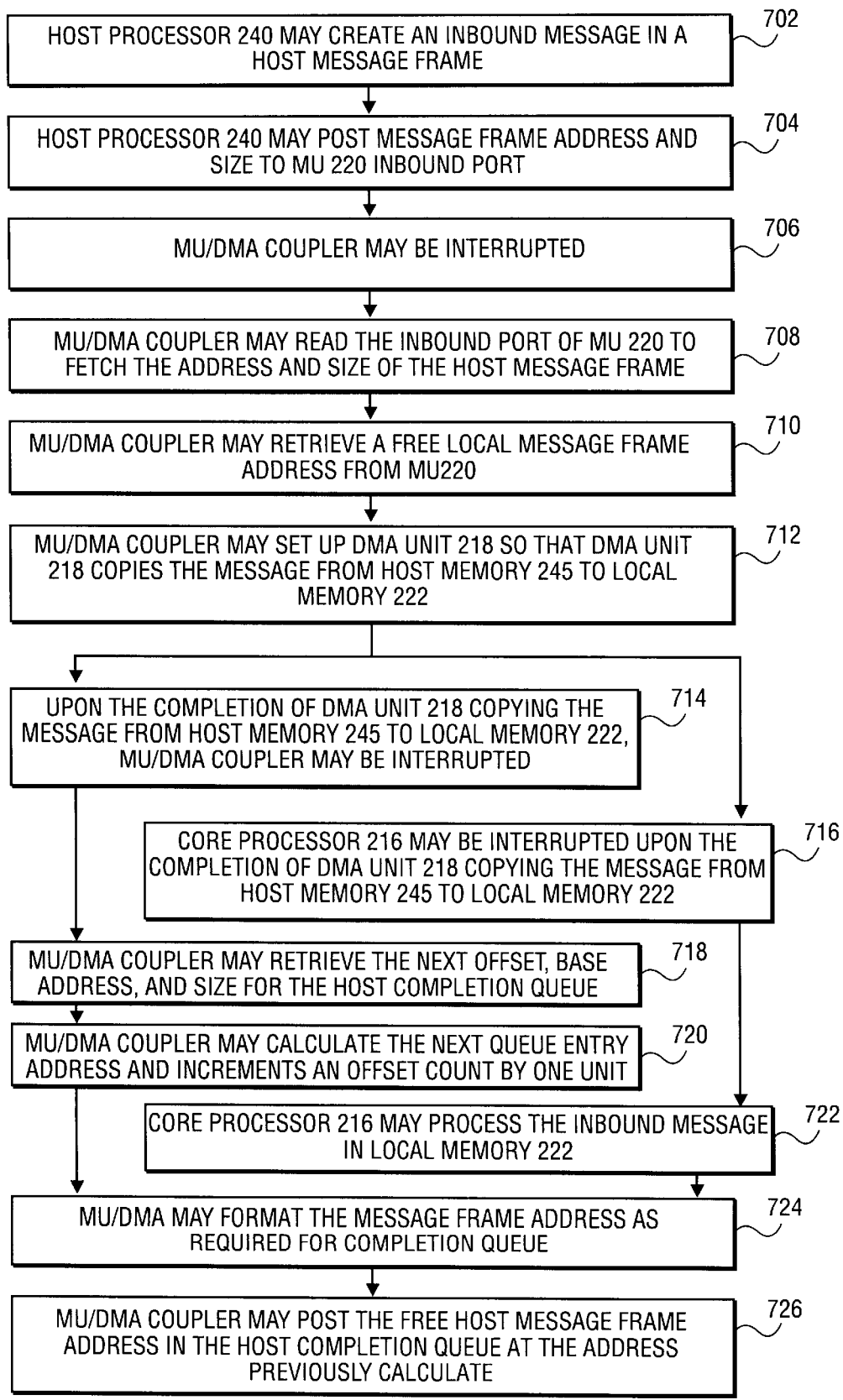
FIG. 5 illustrates method 700 of inbound messaging as an embodiment of the invention that may be implemented in system 200 of FIG. 2.

FIG. 5 illustrates method 700 of inbound messaging as an embodiment of the invention that may be implemented in system 200 of FIG. 2. Method 700 may be implemented in a computer readable storage medium containing executable computer program instructions which when executed cause the networking system to perform method 700. Also, method 700 may be implemented in a distributed readable storage medium containing executable computer program instructions which when executed cause an I/O processor to perform method 700.

A readable medium, including a computer readable storage medium and a distributed readable storage medium, may include any mechanism for storing or transmitting information in a form readable by a machine, such as a computer. For example, a readable medium may include read only memory (ROM); random access memory (RAM); magnetic disk storage media; optical storage media; flash memory devices; electrical, optical, acoustical or other form of propagated signals, such as carrier waves, infrared signals, and digital signals.

At block 702 of method 700, host processor 240 may create an inbound message in a host message frame within host memory 245. At block 704, host processor 240 may post the message frame address and size to the inbound port of MU 220.

As noted above, under conventional method 600, MU 220 would notify core processor 216 of the inbound message and, in turn, core processor 216 would set up DMA unit 218. To operate, DMA unit 218 needs the four inputs of source, transfer type, destination, and size. However, at this point in method 700, MU 220 may possess (i) the source of the message, such as the inbound message frame address in host memory 245, (ii) the transfer type, which may be a read type since the message may be from host processor 240, and (iii) the destination of the message. MU 220 may be used to set up DMA unit 218.

With the message frame address and size at the inbound port of MU 220, the MU/DMA coupler may be interrupted at block 706. At block 708, the MU/DMA coupler may read the inbound port of MU 220 to fetch the address and size of the host message frame. At block 710, the MU/DMA coupler may retrieve a free local message frame address from MU 220.

With a free local message frame address from MU 220, the MU/DMA coupler may now set up DMA unit 218 at block 712 so that DMA unit 218 may copy the message from host memory 245 to local memory 222. Upon the completion of DMA unit 218 copying the message from host memory 245 to local memory 222, MU/DMA coupler may be interrupted at block 714. At block 716 and preferably in parallel to block 714, core processor 216 may be interrupted upon the completion of DMA unit 218 copying the message from host memory 245 to local memory 222.

At block 718, MU/DMA coupler may retrieve the next offset, base address, and size for the host completion queue. At block 720, MU/DMA coupler may calculate the next queue entry address and increment an offset count by one unit. Preferably in parallel to block 720, core processor 216 may process the inbound message in local memory 222 at block 722.

At block 724, MU/DMA coupler may format the message frame address as required for completion queue. At block 726, MU/DMA coupler may post the free host message frame address in the host completion queue at the address previously calculate in block 718. By bringing together the functionality of the Messaging Unit and the Direct Memory Access unit to pass an inbound request message to the local memory, an embodiment of the invention works toward automation within a transfer group of an I/O processor.

Outbound Messaging

Figure 6:
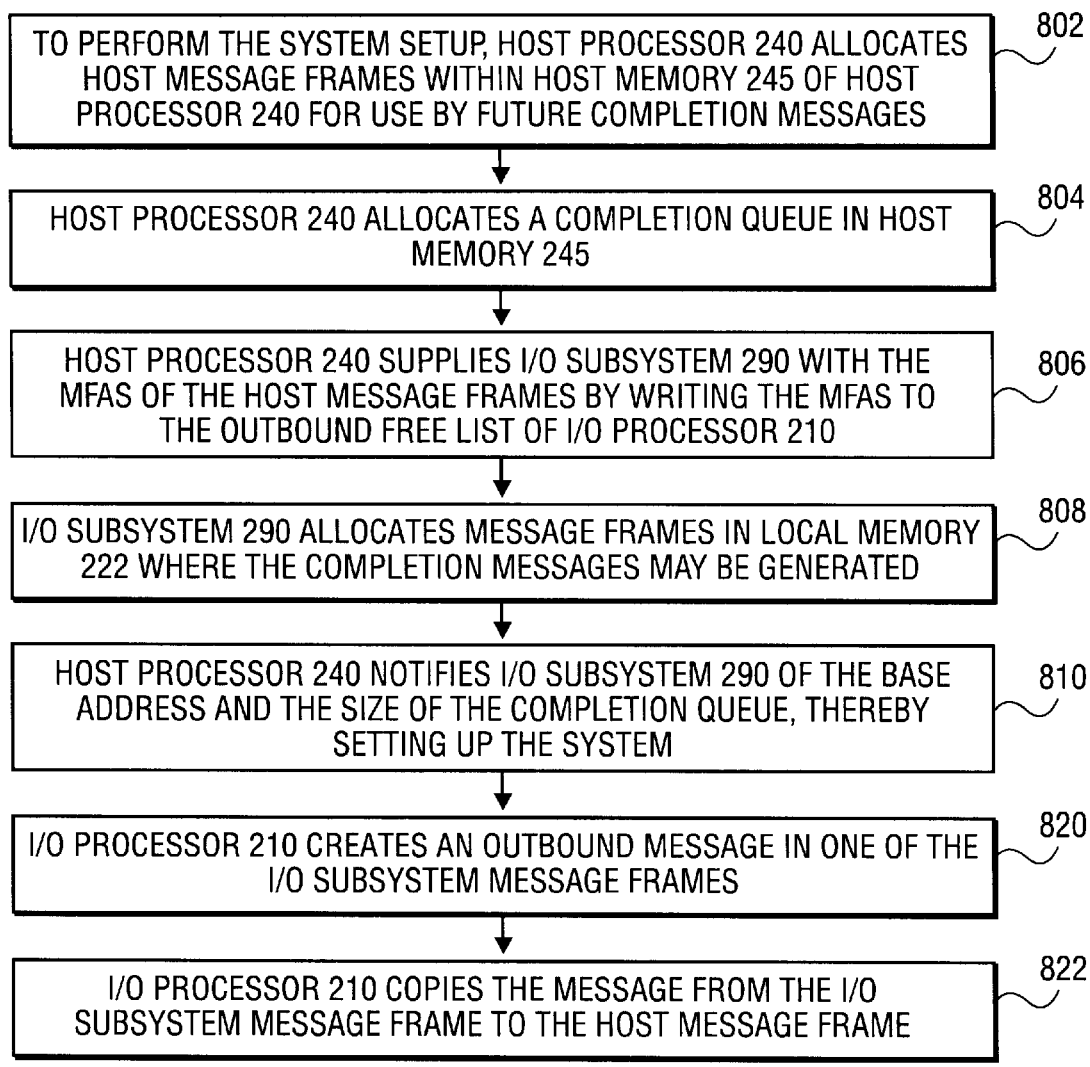
FIG. 6 illustrates method 800 of outbound messaging. Host System 230 first may be set up.

Various schemes exist, for sending messages out from an I/O processor local memory. For example, one scheme for outbound messaging is designed to minimize the direct interaction between a host processor and the I/O subsystem coupled to a PCI agent. This scheme requires the I/O subsystem to move the outbound message from the memory of the I/O subsystem to a host memory for consumption. Where the I/O processor returns message frame addresses of reply and completion messages, the scheme uses a completion queue in host memory. Use of a completion queue in host memory is referred to as the "Outbound Option" in the $I_2O$ Architecture Specification. This scheme is illustrated in FIG. 6.

Figure 7:
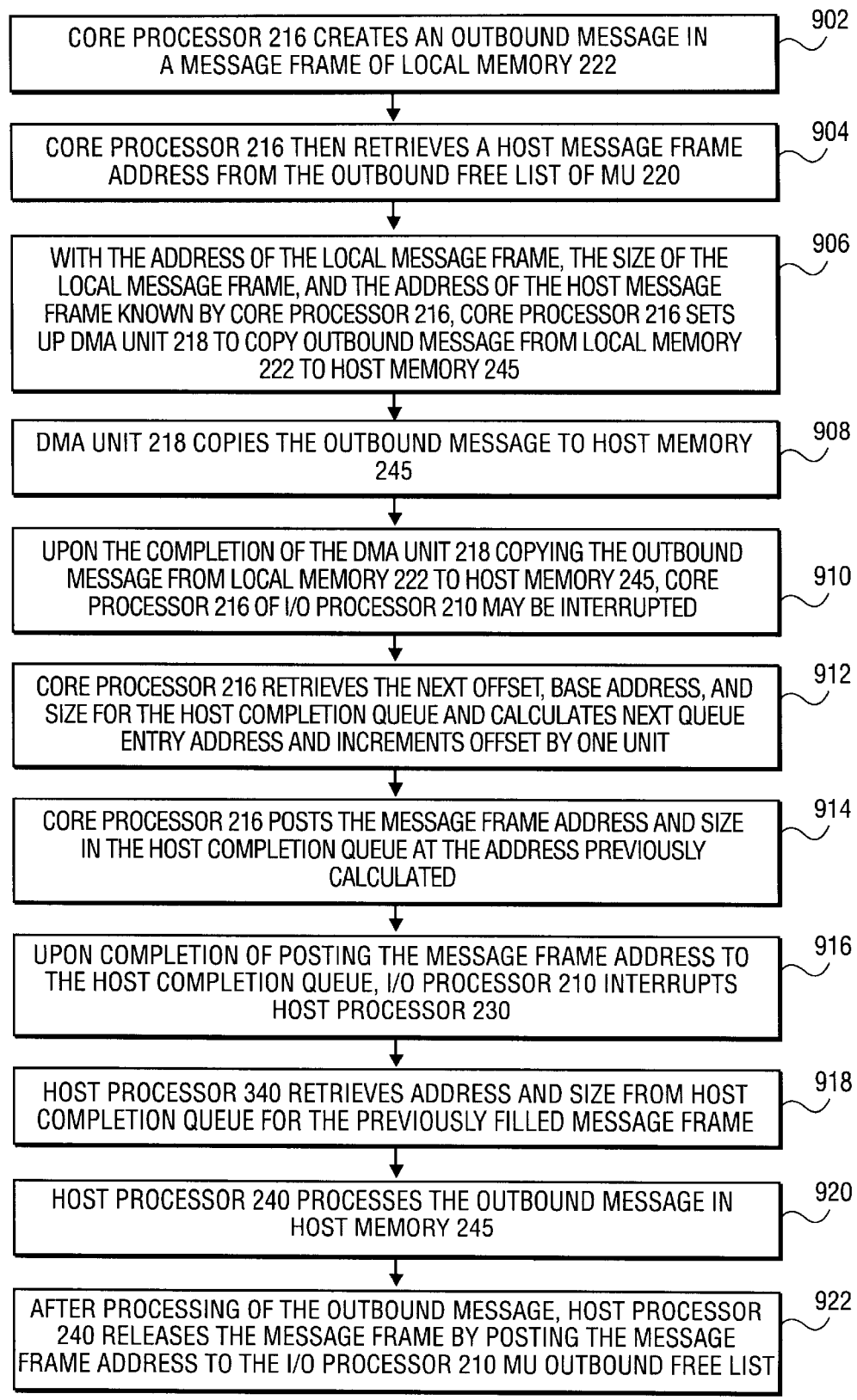
FIG. 7 illustrates method 900 of outbound messaging that may be implemented in system 200 of FIG. 2.

An advantage of the outbound option specified in the $I_2O$ Architecture Specification available from the $I_2O$ Special Internet Group, 404 Balboa Street, San Francisco, Calif., 94118 (www.i2osig.org) is that computer systems may be optimized for memory accesses by the host processor and not I/O subsystem accesses by host processors. In another scheme for sending messages out from an I/O processor, local memory does not use a completion queue in host memory. Under this scheme, the method requires the host processor to access the I/O subsystem for message frame addresses of reply messages. This scheme is illustrated in FIG. 7.

As discussed above, high performance computer systems may implement I/O subsystems with an I/O processor (IOP). It may be the IOP that controls the I/O subsystem. The IOP may be designed with special hardware for managing message address queue lists. The IOP may include a core processor such as core processor 216 to process the messages and access host memory such as host memory 245 and local memory such as local memory 222 of FIG. 2. Moreover, as discussed above, an IOP may also include a DMA unit that efficiently copies data between the local memory of the IOP and a host memory.

Outbound Messaging Operation

FIG. 6 illustrates method 800 of outbound messaging. Host system 230 first may be set up. Then, an outbound message may be created and copied from an I/O subsystem message frame.

To perform system setup, host processor 240 allocates host message frames within host memory 245 of host processor 240 at block 802 for use by future completion messages. At block 804, host processor 240 allocates a completion queue in host memory 245. The completion queue will hold the MFAs of the host message frames when I/O subsystem 290 has completed reproducing or copying the message to host memory 245 from local memory 222 of I/O subsystem 290.

At block 806, host processor 240 supplies I/O subsystem 290 with the MFAs of the host message frames by writing the MFAs to the outbound free list of I/O processor 210. I/O subsystem 290 allocates message frames in local memory 222 at block 808 where the completion messages may be generated. At block 810, host processor 240 notifies I/O subsystem 290 of the base address and the size of the completion queue, thereby setting up the system.

Outbound Message Sequence

With host system 230 set up, method 800 proceeds from block 810 to block 820. At block 820, I/O processor 210 creates an outbound message in one of the I/O subsystem message frames. At block 822, I/O processor 210 copies the message from the I/O subsystem message frame to the host message frame.

FIG. 7 illustrates method 900 of outbound messaging that may be implemented in system 200 of FIG. 2. At block 902, core processor 216 creates an outbound message in a message frame of local memory 222. Core processor 216 then retrieves a host message frame address from the outbound free list of MU 220 at block 904. With the address of the local message, the size of the local message frame, and the address of the host message frame known by core processor 216, core processor 216 sets up DMA unit 218 at block 906 to copy outbound message from local memory 222 to host memory 245. At block 908, DMA unit 218 copies the outbound message to host memory 245.

Upon the completion of the DMA unit 218 copying the outbound message from local memory 222 to host memory 245, core processor 216 of I/O processor 210 may be interrupted at block 910. At block 912 core processor 216 retrieves the next offset, base address, and size for the host completion queue and calculates next queue entry address and increments offset by one unit. At block 914 core processor 216 posts the message frame address and size in the host completion queue at the address previously calculated. Upon completion of posting the message frame address to the host completion queue, I/O processor 210 interrupts host processor 230 in block 916. Host processor 340 retrieves address and size from host completion queue for the previously filled message frame at block 918. At block 920, host processor 240 processes the outbound message in host memory 245. After processing of the outbound message at block 920, host processor 240 releases the message frame by posting the message frame address to the I/O processor 210 MU outbound free list at block 922.

Outbound Message Sequence Embodiment

An embodiment of the invention may create a coupling between the MU 220 and DMA unit 218 so that the outbound message sequence can be performed autonomously, freeing core processor 216 for the important work of processing messages. The coupling may be created by a MU/DMA coupler formed of hardware state machines that may reside in the hardware design of the MU and DMA units.

Figure 8:
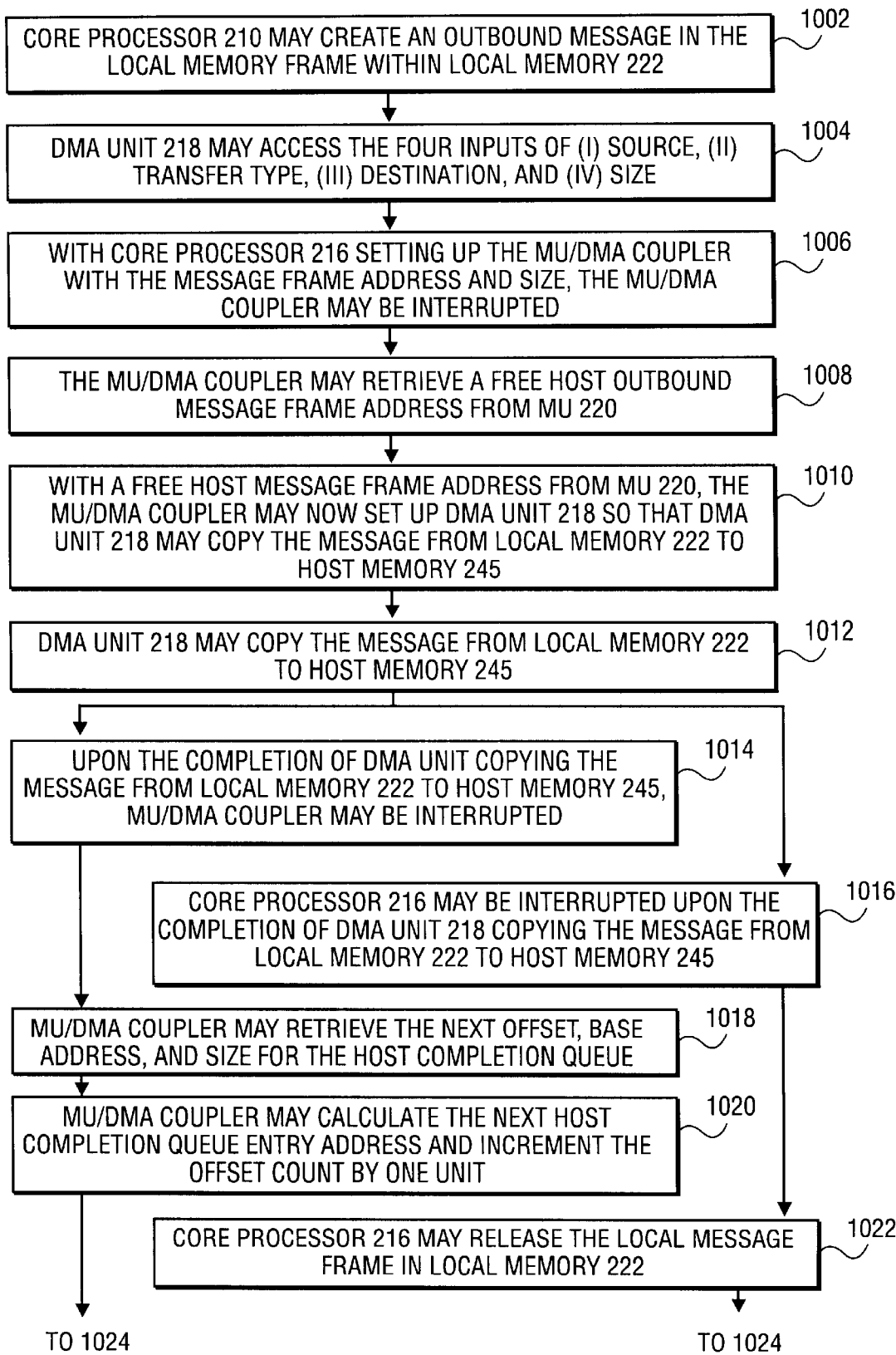
FIG. 8 illustrates method 1000 of outbound messaging as an embodiment of the invention that may be implemented in system 200 of FIG. 2.
Figure 8:
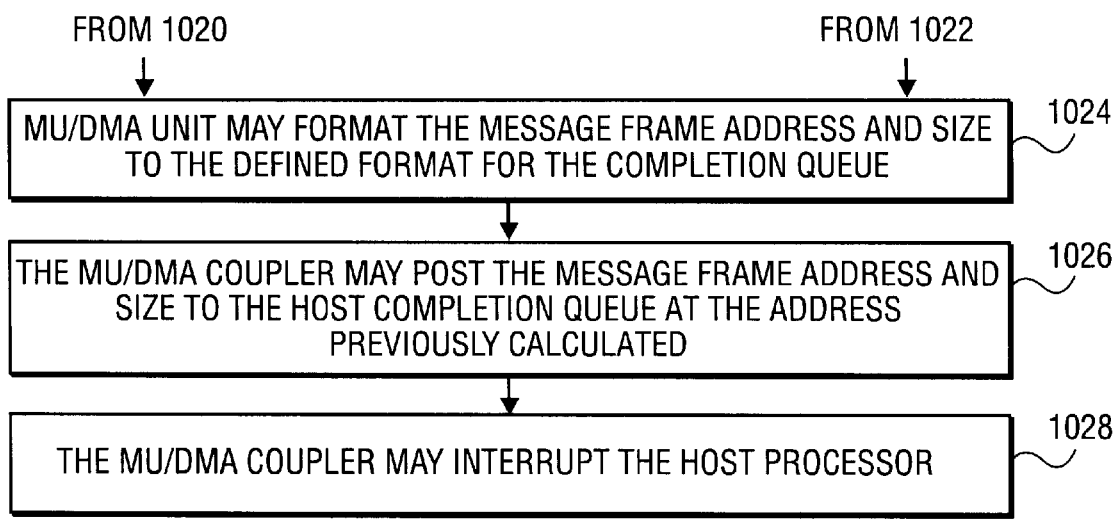

FIG. 8 illustrates method 1000 of outbound messaging as an embodiment of the invention that may be implemented in system 200 of FIG. 2. At block 1002, core processor 210 may create an outbound message in the local message frame within local memory 222. As noted above under conventional method 900, core processor 216 retrieves a host message frame address and, in turn, sets up DMA unit 218.

To perform method 1000 of the invention, DMA unit 218 may require the four inputs of: (i) source of the message, (ii) transfer type of the message, (iii) destination of the message, and (iv) size of the message. After block 1002 in method 1000, core processor 216 may possess the source of the message, such as the message frame address in local memory 222, and the size of the message. Moreover, MU 220 may possess the transfer type, which may be a write type since the message may be to host processor 240, and the destination of the message, such as the MFA from the MU outbound free list. Thus, at block 1004, DMA unit 218 may access the four inputs of (i) source, (ii) transfer type, (iii) destination, and (iv) size.

With core processor 216 setting up the MU/DMA coupler with the message frame address and size, the MU/DMA coupler may be interrupted at block 1006. At block 1008, the MU/DMA coupler may retrieve a free host outbound message frame address from MU 220. With a free host message frame address from MU 220, the MU/DMA coupler may now set up DMA unit 218 at block 1010 so that DMA unit 218 may copy the message from local memory 222 to host memory 245. At block 1012, DMA unit 218 may copy the message from local memory 222 to host memory 245.

Upon the completion of DMA unit copying the message from local memory 222 to host memory 245, MU/DMA coupler may be interrupted at block 1014. At block 1016 and preferably in parallel to block 1014, core processor 216 may be interrupted upon the completion of DMA unit 218 copying the message from local memory 222 to host memory 245. At block 1018, MU/DMA coupler may retrieve the next offset, base address, and size for the host completion queue. At block 1020, MU/DMA coupler may calculate the next host completion queue entry address and increment the offset by one unit. Preferably in parallel to blocks 1018 and 1020, core processor 216 may release the local message frame in local memory 222 in block 1022. At block 1024, the MU/DMA unit may format the message frame address and size to the defined format for the completion queue. Then, at block 1026, the MU/DMA coupler may post the message frame address and size to the host completion queue at the address previously calculated in block 1020. At block 1028, the MU/DMA coupler may interrupt the host processor. By bringing together the functionality of the Messaging Unit and the Direct Memory Access unit to pass an outbound reply message to the host memory, an embodiment of the invention works towards providing a better automation within a transfer group of an I/O processor.

The exemplary embodiments described herein are provided merely to illustrate the principles of the invention and should not be construed as limiting the scope of the subject matter of the terms of the claimed invention. The principles of the invention may be applied toward a wide range of systems to achieve the advantages described herein and to achieve other advantages or to satisfy other objectives, as well.

What is claimed is:

1. A method comprising:
   receiving a message at a messaging unit within a processor, the message including attributes of an inbound message located outside the messaging unit;
   retrieving a free local message frame address from the messaging unit;
   setting up a direct memory access (DMA) unit coupled to the messaging unit; and
   copying the inbound message located outside the messaging unit into a local memory of the processor utilizing the attributes and the free local-message-frame address.

2. The method of claim 1 wherein the attributes correspond to the inbound message in a host message frame, the message in the host message frame is created by a host processor.

3. The method of claim 2 further comprising in fetching the attributes from the messaging unit.

4. The method of claim 1, further comprising:
   posting the message to an inbound port of the messaging unit.

5. The method of claim 3 wherein fetching the attributes includes reading the message from an inbound port of the messaging unit.

6. The method of claim 3, fetching the attributes includes accessing a messaging unit/direct memory access (MU/DMA) coupler within the processor to read the messaging unit.

7. The method of claim 6, further comprising:

interrupting the MU/DMA coupler.

8. The method of claim 7, wherein retrieving the free local message frame address includes employing the MU/DMA coupler to retrieve the free local message frame address, and wherein setting up the DMA unit includes employing the MU/DMA coupler to set up the DMA unit.

9. The method of claim 8, wherein copying the message includes employing the DMA unit to copy the inbound message into the local memory.

10. The method of claim 9, wherein copying the message into the local memory includes copying the inbound message from a host memory to the local memory.

11. The method of claim 10, further comprising:

interrupting a core processor in parallel to interrupting the MU/DMA coupler.

12. The method of claim 11, further comprising:

employing the MU/DMA coupler to retrieve a next offset for a host completion queue and to increment an offset count location by one unit.

13. The method of claim 12, further comprising:

employing the core processor to process the message in the local memory in parallel to employing the MU/DMA coupler to retrieve a next offset; and employing the MU/DMA coupler to post a free host message frame address in the host completion queue at the offset count location.

14. The method of claim 1 wherein the attributes are a frame address and a message size of the inbound message.

15. A storage medium containing instructions which, when executed, cause a processor to perform a method comprising:

receiving a message at a messaging unit within the processor, the message including attributes of an inbound message located outside the messaging unit;

retrieving a free local message frame address from the messaging unit;

setting up a direct memory access unit coupled to the messaging unit; and copying the inbound message located outside the messaging unit into a local memory of the processor, utilizing the attributes and the free local message frame address.

16. The method of claim 15 wherein the attributes correspond to the inbound message in a host message frame, the message in the host message frame is created by a host processor.

17. The method of claim 16 further comprising fetching the frame address and the message size from the messaging unit.

18. The apparatus of claim 15 wherein the attributes are a frame address and a message size of the inbound message.

* * * * *